US012753376B2

(12) United States Patent
Astolfi et al.

(10) Patent No.: US 12,753,376 B2
(45) Date of Patent: Oct. 6, 2026

(54) CLEANSING COMPOSITION

(71) Applicant: Conopco, Inc., Englewood Cliffs, NJ (US)

(72) Inventors: Rafael Astolfi, Sao Paulo (BR); Sergio Roberto Leopoldino, Sao Paulo (BR); Yuriy Konstantinovich Yarovoy, Monroe, CT (US)

(73) Assignee: Conopco, Inc., Hoboken, NJ (US)

( * ) Notice: Subject to any disclaimer, the term of this patent is extended or adjusted under 35 U.S.C. 154(b) by 179 days.

(21) Appl. No.: 18/693,279

(22) PCT Filed: Sep. 13, 2022

(86) PCT No.: PCT/EP2022/075443

§ 371 (c)(1),
(2) Date: Mar. 19, 2024

(87) PCT Pub. No.: WO2023/052124

PCT Pub. Date: Apr. 6, 2023

(65) Prior Publication Data

US 2024/0384208 A1 Nov. 21, 2024

(30) Foreign Application Priority Data

Sep. 28, 2021 (EP) .................................... 21199326

(51) Int. Cl.

| | |
|---|---|
| ***C11D 3/00*** | (2006.01) |
| ***C11D 3/20*** | (2006.01) |
| ***C11D 3/37*** | (2006.01) |
| ***C11D 10/04*** | (2006.01) |
| ***C11D 17/00*** | (2006.01) |
| *C11D 1/14* | (2006.01) |
| *C11D 1/90* | (2006.01) |
| *C11D 9/02* | (2006.01) |

(52) U.S. Cl.

CPC .......... *C11D 10/042* (2013.01); *C11D 3/2065* (2013.01); *C11D 3/2079* (2013.01); *C11D 3/3707* (2013.01); *C11D 17/006* (2013.01); *C11D 1/143* (2013.01); *C11D 1/146* (2013.01); *C11D 1/90* (2013.01); *C11D 9/02* (2013.01)

(58) Field of Classification Search

None

See application file for complete search history.

(56) References Cited

U.S. PATENT DOCUMENTS

| | | | |
|---|---|---|---|
| 5,009,814 | A | 4/1991 | Kelkenberg et al. |
| 5,225,097 | A | 7/1993 | Kacher et al. |
| 5,225,098 | A | 7/1993 | Kacher et al. |
| 5,227,086 | A | 7/1993 | Kacher et al. |
| 5,262,079 | A | 11/1993 | Kacher et al. |
| 5,389,279 | A | 2/1995 | Au et al. |
| 5,393,466 | A | 2/1995 | Ilardi et al. |
| 6,214,780 | B1 | 4/2001 | Narath et al. |
| 6,458,751 | B1 | 10/2002 | Abbas et al. |
| 6,462,004 | B2 | 10/2002 | Farrell et al. |
| 6,849,585 | B1 | 2/2005 | Farrell et al. |
| 2006/0135385 | A1 | 6/2006 | Massaro et al. |
| 2007/0212323 | A1 | 9/2007 | Polonka et al. |
| 2014/0194646 | A1 | 7/2014 | Allen et al. |
| 2015/0104530 | A1 | 4/2015 | Perry |
| 2017/0002297 | A1 | 1/2017 | Klug et al. |

FOREIGN PATENT DOCUMENTS

| | | |
|---|---|---|
| EP | 0556957 | 8/1993 |
| EP | 1704219 | 8/2008 |
| EP | 3181114 | 6/2017 |
| GB | 2316087 | 2/1998 |
| GB | 2576336 | 2/2020 |
| WO | WO9306205 | 4/1993 |
| WO | WO9842815 | 10/1998 |
| WO | WO0012670 | 3/2000 |
| WO | WO0250226 | 6/2002 |
| WO | WO2004024120 | 3/2004 |
| WO | WO2004082655 | 9/2004 |

OTHER PUBLICATIONS

Search Report and Written Opinion in PCTEP2022075443; Jan. 20, 2023; World Intellectual Property Org. (WIPO).
Search Report and Written Opinion in EP21199326; Mar. 11, 2022; European Patent Office (EPO).
Written Opinion 1 of the IPEA in PCTEP2022075443; Aug. 23, 2023; World Intellectual Property Org. (WIPO).
Written Opinion 2 of the IPEA in PCTEP2022075443; Dec. 5, 2023; World Intellectual Property Org. (WIPO).
IPRP2 in PCTEP2022075443; Feb. 15, 2024; World Intellectual Property Org. (WIPO).

*Primary Examiner* — Necholus Ogden, Jr.
(74) *Attorney, Agent, or Firm* — Krista J. Aiello

(57) ABSTRACT

A cleansing composition comprises a surfactant and a structurant. The structurant comprises a mixture of a fatty acid and a fatty acid soap. The fatty acid is present in an amount of greater than or equal to 88% by weight of the mixture, preferably greater than or equal to 95% by weight of the mixture, more preferably greater than or equal to 99% by weight of the mixture.

5 Claims, No Drawings

CLEANSING COMPOSITION

CROSS REFERENCE TO RELATED APPLICATIONS

The present application is a U.S. National Phase Application under 35 U.S.C. § 371 of International Application No. PCT/EP2022/075443, filed on Sep. 13, 2022, which claims priority to European Patent Application No. 21199326.6, filed on Sep. 28, 2021, the contents of which are incorporated herein in their entireties.

FIELD OF THE INVENTION

Disclosed herein is a cleansing composition. The cleansing composition includes a surfactant and a structurant. The structurant comprises a mixture of a fatty acid and a fatty acid soap. The fatty acid is present in an amount of greater than or equal to 88% by weight of the mixture.

BACKGROUND OF THE INVENTION

Bars based on synthetic surfactant ("syndet" bars) and structured with fatty acid or partially neutralized fatty acid are known. Syndet bars generally have neutral or slightly acidic pH, milder to the skin than soap-based products and so can be desired by consumers. Such mildness comes with disadvantages to the bar maker. The bar maker has difficulty processing bars using conventional high throughput plodding-stamping soap making process due to the soft and sticky nature of such products. Therefore, alternate soap making processes have been proposed. For example, U.S. Pat. Nos. 5,225,097, 5,225,098, 5,227,086, and 5,262,079 disclose syndet bars structured with fatty acid or partially neutralized fatty acid that are made by melt-cast or freezer processes. These bars have from 15% to 40% or to 55% water and can't be manufactured using conventional plodding-stamping process.

U.S. Pat. No. 6,489,585 B1 discloses bars comprising a minimum of about 65% of a combination of fatty acid soap and free fatty acids; less than about 25% synthetic surfactant, and from about 1 to about 15% water. These bars are made by a conventional plodding-stamping process.

The soap in bar compositions is generally known to serve several purposes. First, it helps structure the bars, so they do not crumble when the bar is being finished (e.g., extruded, stamped) and as a final user bar. Fatty acid soap also provides some beneficial user properties such as good lather and a certain skin feel which can be desirable to consumers. In addition, soap is generally cheaper than most anionics and can provide cost savings.

U.S. Pat. No. 6,462,004 B2 discloses a bar composition comprising 20% to 75% by weight of an anionic surfactant, about to 20% or more of a fatty acid soap, 4 to 30% by weight free fatty acid, and a source of divalent cation made available to the mix solution in a sufficient amount to react with the soluble soap dissolved in unbound water. In the soap bars disclosed therein, the degree of softness and stickiness during final bar production can be lessened or alleviated.

It can be desirable, however, to reduce the amount of soap present in bar compositions to provide milder bars that can still be processed efficiently (via plodding and stamping) without a negative effect on foaming properties.

SUMMARY OF THE INVENTION

Disclosed in various aspects are cleansing compositions. A cleansing composition comprises a surfactant and a structurant. The structurant comprises a mixture of a fatty acid and a fatty acid soap. The fatty acid is present in an amount of greater than or equal to 88% by weight of the mixture, preferably greater than or equal to 95% by weight of the mixture, more preferably greater than or equal to 99% by weight of the mixture.

These and other features and characteristics are more particularly described below.

DETAILED DESCRIPTION OF THE INVENTION

Disclosed herein are cleansing compositions. The cleansing composition comprises a surfactant and a structurant. The structurant comprises a mixture of a fatty acid and a fatty acid soap. The fatty acid can be present in an amount of greater than or equal to 88% by weight of the mixture. For example, the fatty acid can be present in an amount of greater than or equal to 95% by weight of the mixture. For example, the fatty acid can be present in an amount of greater than or equal to 99% by weight of the mixture. It was unexpectedly discovered that bars that process well and have desirable lathering properties can be made using less soap than previously known, e.g., less than 12.5% by weight caustic, or substantially free (i.e., essentially free) of fatty acid soap. Substantially free or essentially free as used with respect to soap (e.g., fatty acid soap) means that less than or equal to 12% by weight caustic is present, preferably, less than or equal to 5% by weight caustic is present, more preferably, less than or equal to 1% by weight caustic is present. Such compositions and bars made from the compositions have a lower pH than bars containing more fatty acid soap and/or caustic, are milder to the skin, and still contain desirable foaming properties. For example, the cleansing compositions disclosed herein can have a pH of 4.0 to 7.0, preferably, 4.5 to 6.0.

For example, the cleansing composition can comprise less than or equal to 12.5% by weight of the fatty acid soap, for example, less than or equal to 5% by weight fatty acid soap can be present, for example, less than or equal to 1% by weight fatty acid soap can be present. The cleansing composition can be essentially free from fatty acid soap where essentially free means 12% by weight fatty acid soap is present, preferably, less than or equal to 5% by weight fatty acid soap is present, more preferably, less than or equal to 1% by weight fatty acid soap is present, or even less than or equal to 0.5% by weight fatty acid soap is present in the cleansing compositions.

The cleansing compositions can be made into bars. The bars made from these compositions can have a Zein score of less than or equal to 0.4, for example, 0.2 to 0.4, a lather of greater than or equal to 250, for examples, greater than or equal to 275, for example, 250 to 450.

The surfactant can be present in an amount of less than or equal to 40% by weight of the overall cleansing composition. For example, the surfactant can be present in an amount of less than or equal to 30% by weight of the overall cleansing composition, for example, less than or equal to 25% by weight of the overall cleansing composition, for example, 10% to 24% by weight of the overall cleansing composition.

The surfactant can comprise an anionic surfactant, an amphoteric surfactant, a zwitterionic surfactant, a cationic surfactant, a non-ionic surfactant, or a combination thereof.

The surfactant can contain $C_8$-$C_{18}$ alkyl groups, for example, $C_{12}$-$C_{16}$ alkyl groups, for example, $C_{10}$-$C_{14}$ alkyl groups, or mixtures thereof. For example, the surfactant and/or co-surfactant can contain $C_{10}$ alkyl groups, $C_{12}$ alkyl groups, $C_{14}$ alkyl groups, or any combination thereof.

When present, the anionic surfactant used can include aliphatic sulfonates, such as a primary alkane (e.g., $C_8$-$C_{22}$) sulfonate, primary alkane (e.g., $C_8$-$C_{22}$) disulfonate, $C_8$-$C_{22}$ alkene sulfonate, $C_8$-$C_{22}$ hydroxyalkane sulfonate or alkyl glyceryl ether sulfonate (AGS); or aromatic sulfonates such as alkyl benzene sulfonate. The anionic surfactant may also be an alkyl sulfate (e.g., $C_{12}$-$C_{18}$ alkyl sulfate) or alkyl ether sulfate (including alkyl glyceryl ether sulfates). Among the alkyl ether sulfates are those having the formula:

$$RO(CH_2CH_2O)_nSO_3M$$

wherein R is an alkyl or alkenyl having 8 to 18 carbons, preferably 12 to 18 carbons, n has an average value of at least 1.0, preferably less than 5, and most preferably 1 to 4, and M is a solubilizing cation such as sodium, potassium, ammonium or substituted ammonium.

The anionic surfactant may also be alkyl sulfosuccinates (including mono- and dialkyl, e.g., $C_6$-$C_{22}$ sulfosuccinates); alkyl and acyl taurates (often methyl taurates), alkyl and acyl sarcosinates, sulfoacetates, $C_8$-$C_{22}$ alkyl phosphates and phosphonates, alkyl phosphate esters and alkoxyl alkyl phosphate esters, acyl lactates, $C_8$-$C_{22}$ monoalkyl succinates and maleates, sulphoacetates, alkyl glucosides and acyl isethionates, and the like.

Sulfosuccinates may be monoalkyl sulfosuccinates having the formula:

$$R^1OC(O)CH_2CH(SO_3M)CO_2M;$$

and amide-MEA sulfosuccinates of the formula:

$$R_1CONHCH_2CH_2OC(O)CH_2CH(SO_3M)CO_2M$$

wherein $R^1$ ranges from $C_8$-$C_{22}$ alkyl.

Sarcosinates are generally indicated by the formula:

$R^2CON(CH_3)CH_2CO_2M$, wherein $R^2$ ranges from $C_8$-$C_{20}$ alkyl.

Taurates are generally identified by formula:

$$R^3CONR^4CH_2CH_2SO_3M$$

wherein $R^3$ is a $C_8$-$C_{20}$ alkyl, $R^4$ is a $C_1$-$C_4$ alkyl.

M is a solubilizing cation as previously described.

The cleansing composition disclosed herein may contain $C_8$-$C_{18}$ acyl isethionates. These esters are prepared by a reaction between alkali metal isethionate with mixed aliphatic fatty acids having from 6 to 18 carbon atoms and an iodine value of less than 20. At least 75% of the mixed fatty acids have from 12 to 18 carbon atoms and up to 25% have from 6 to 10 carbon atoms.

The acyl isethionate may be an alkoxylated isethionate such as is described in Ilardi et al., U.S. Pat. No. 5,393,466, entitled "Fatty Acid Esters of Polyalkoxylated isethonic acid; issued Feb. 28, 1995; hereby incorporated by reference. This compound has the general formula:

$$R^5C—(O)O—C(X)H—C(Y)H—(OCH_2—CH_2)_m—SO_3M$$

wherein $R^5$ is an alkyl group having 8 to 18 carbons, m is an integer from 1 to 4, X and Y are each independently hydrogen or an alkyl group having 1 to 4 carbons and M is a solubilizing cation as previously described.

In an aspect of the cleansing composition, the anionic surfactant used can be 2-acrylamido-2-methylpropane sulfonic acid, ammonium lauryl sulfate, ammonium perfluorononanoate, potassium lauryl sulfate, sodium alkyl sulfate, sodium dodecyl sulfate, sodium laurate, sodium laureth sulfate, sodium lauroyl sarcosinate, sodium stearate, sodium sulfosuccinate esters, sodium lauroyl isethionate, or a combination thereof. In an aspect, the anionic surfactant used can be cocamidopropyl hydroxysultaine, cocamido sulfosuccinate, sodium lauroyl isethionate, or a combination thereof, preferably wherein the surfactant is sodium lauroyl isethionate, cocamido sulfosuccinate, or a combination thereof. Such anionic surfactants are commercially available from suppliers like Galaxy Surfactants, Clariant, Sino Lion, Stepan Company, and Innospec.

In an embodiment, the anionic surfactant comprises cocamidopropyl hydroxysultaine, cocamido sulfosuccinate, sodium lauroyl isethionate, sodium cocoyl isethionate, sodium dodecyl sulfate, sodium methyl cocoyl taurate, sodium cocoyl glycinate, methyl ester sulfonate, fatty acid ester sulfonate, or a combination thereof, preferably wherein the surfactant is sodium lauroyl isethionate, cocamido sulfosuccinate, sodium cocoyl isethionate, sodium dodecyl sulfate, methyl ester sulfonate, or a combination thereof.

Optionally, amphoteric surfactants can be included in the cleansing compositions disclosed herein. Amphoteric surfactants (which depending on pH can be zwitterionic) include sodium acyl amphoacetates, sodium acyl amphopropionates, disodium acyl amphodiacetates and disodium acyl amphodipropionates where the acyl (i.e., alkanoyl group) can comprise a $C_7$-$C_{18}$ alkyl portion. Illustrative examples of amphoteric surfactants include sodium lauroamphoacetate, sodium cocoamphoacetate, or a combination thereof.

As to the zwitterionic surfactants optionally employed in the present cleansing composition, such surfactants include at least one acid group. Such an acid group may be a carboxylic or a sulphonic acid group. They often include quaternary nitrogen, and therefore, can be quaternary amino acids. They should generally include an alkyl or alkenyl group of 7 to 18 carbon atoms and generally comply with an overall structural formula:

$$R^6—[—C(O)—NH(CH_2)_q—]_r—N^+(R^7)(R^8)\text{-A-B}$$

where $R^6$ is alkyl or alkenyl of 7 to 18 carbon atoms; $R^7$ and $R^8$ are each independently alkyl, hydroxyalkyl or carboxyalkyl of 1 to 3 carbon atoms; q is 2 to 4; r is 0 to 1; A is alkylene of 1 to 3 carbon atoms optionally substituted with hydroxyl, and B is $—CO_2—$ or $—SO_3—$.

Desirable zwitterionic surfactants for use in the cleansing composition disclosed herein and within the above general formula include simple betaines of formula:

$$R^6—N^+(R^7)(R^8)—CH_2CO_2^-$$

and amido betaines of formula:

$$R^6—CONH(CH_2)_t—N^+(R^7)(R^8)—CH_2CO_2^-$$

where t is 2 or 3.

In both formulae $R^6$, $R^7$ and $R^8$ are as defined previously. $R^6$ may, in particular, be a mixture of $C_{12}$ and $C_{14}$ alkyl groups derived from coconut oil so that at least half, preferably at least three quarters of the groups Re have 10 to 14 carbon atoms. $R^7$ and $R^8$ are preferably methyl.

A further possibility is that the zwitterionic surfactant is a sulphobetaine of formula:

$$R^6—N^+(R^7)(R^8)—(CH_2)_3SO_3^- \text{ or}$$

$$R^6—CONH(CH_2)_u—N^+(R^7)(R^8)—(CH_2)_3SO_3^-$$

where u is 2 or 3, or variants of these in which $—(CH_2)_3SO_3^-$ is replaced by $$—CH_2C(OH)(H)CH_2SO_3^-.$$

In these formulae, $R^6$, $R^7$ and $R^8$ are as previously defined.

Illustrative examples of the zwitterionic surfactants desirable for use include betaines such as lauryl betaine, betaine citrate, cocodimethyl carboxymethyl betaine, cocoamidopropyl betaine, coco alkyldimethyl betaine, and laurylamidopropyl betaine. An additional zwitterionic surfactant suitable for use includes cocoamidopropyl sultaine, for example, cocamidopropyl hydroxysultaine. Preferred zwitterionic surfactants include lauryl betaine, betaine citrate, sodium hydroxymethylglycinate, (carboxymethyl) dimethyl-3-[(1-oxododecyl) amino] propylammonium hydroxide, coco alkyldimethyl betaine, (carboxymethyl) dimethyloleylammonium hydroxide, cocoamidopropyl betaine, (carboxymethyl) dimethyloleylammonium hydroxide, cocoamidopropyl betaine, (carboxylatomethyl) dimethyl (octadecyl) ammonium, cocamidopropyl hydroxysultaine, or a combination thereof. Such surfactants are made commercially available from suppliers like Stepan Company, Solvay, Evonik and the like and it is within the scope of the cleansing compositions disclosed herein to employ mixtures of the aforementioned surfactants.

Nonionic surfactants may optionally be used in the cleansing composition. When used, nonionic surfactants are typically used at levels as low as 0.5, 1, 1.5 or 2% by weight and at levels as high as 6, 8, 10 or 12% by weight, including any and all ranges and endpoints subsumed therein. The nonionic surfactants which may be used include in particular the reaction products of compounds having a hydrophobic group and a reactive hydrogen atom, for example aliphatic alcohols, acids, amides or alkylphenols with alkylene oxides, especially ethylene oxide either alone or with propylene oxide. Specific nonionic surfactant compounds are alkyl ($C_6$-$C_{22}$) phenols, ethylene oxide condensates, the condensation products of aliphatic ($C_8$-$C_{18}$) primary or secondary linear or branched alcohols with ethylene oxide, and products made by condensation of ethylene oxide with the reaction products of propylene oxide and ethylenediamine. Other nonionic surfactants include long chain tertiary amine oxides, long chain tertiary phosphine oxides, dialkyl sulphoxides, and the like.

In an aspect, nonionic surfactants can include fatty acid/alcohol ethoxylates having the following structures a) $HOCH_2(CH_2)_s(CH_2CH_2O)_c$ H or b) $HOOC(CH_2)_v(CH_2CH_2O)_dH$; where s and v are each independently an integer up to 18; and c and d are each independently an integer from 1 or greater. In an aspect, s and v can be each independently 6 to 18; and c and d can be each independently 1 to 30. Other options for nonionic surfactants include those having the formula $HOOC(CH_2)_i—CH{=}CH—(CH_2)_k(CH_2CH_2O)_z$ H, where i, k are each independently 5 to 15; and z is 5 to 50. In another aspect, i and k are each independently 6 to 12; and z is 15 to 35.

The nonionic surfactant may also include a sugar amide, such as a polysaccharide amide. Specifically, the surfactant may be one of the lactobionamides described in U.S. Pat. No. 5,389,279 to Au et al., entitled "Compositions Comprising Nonionic Glycolipid Surfactants" issued Feb. 14, 1995; which is hereby incorporated by reference or it may be one of the sugar amides described in U.S. Pat. No. 5,009,814 to Kelkenberg, titled "Use of N-Poly Hydroxyalkyl Fatty Acid Amides as Thickening Agents for Liquid Aqueous Surfactant Systems" issued Apr. 23, 1991; hereby incorporated into the subject application by reference.

Illustrative examples of nonionic surfactants that can optionally be used in the cleansing compositions disclosed herein include, but are not limited to, polyglycoside, cetyl alcohol, decyl glucoside, lauryl glucoside, octaethylene glycol monododecyl ether, n-octyl beta-d-thioglucopyranoside, octyl glucoside, oleyl alcohol, polysorbate, sorbitan, stearyl alcohol, cetostearyl alcohol ethoxylate (80 EO), or a combination thereof.

Without wishing to be bound by theory, it is believed that nonionic surfactants such as cetostearyl alcohol ethoxylate can work synergistically with an amphoteric and/or zwitterionic surfactant.

In an aspect, cationic surfactants may optionally be used in the cleansing composition of the present application.

One class of cationic surfactants includes heterocyclic ammonium salts such as cetyl or stearyl pyridinium chloride, alkyl amidoethyl pyrrylinodium methyl sulfate, and lapyrium chloride.

Tetra alkyl ammonium salts are another useful class of cationic surfactants for use. Examples include cetyl or stearyl trimethyl ammonium chloride or bromide; hydrogenated palm or tallow trimethylammonium halides; behenyl trimethyl ammonium halides or methyl sulfates; decyl isononyl dimethyl ammonium halides; ditallow (or distearyl) dimethyl ammonium halides, and behenyl dimethyl ammonium chloride.

Still other types of cationic surfactants that may be used are the various ethoxylated quaternary amines and ester quats. Examples include PEG-5 stearyl ammonium lactate (e.g., Genamin KSL manufactured by Clariant), PEG-2 coco ammonium chloride, PEG-15 hydrogenated tallow ammonium chloride, PEG 15 stearyl ammonium chloride, dipalmitoyl ethyl methyl ammonium chloride, dipalmitoyl hydroxyethyl methyl sulfate, and stearyl amidopropyl dimethylamine lactate.

Still other useful cationic surfactants include quaternized hydrolysates of silk, wheat, and keratin proteins, and it is within the scope of the cleansing composition to use mixtures of the aforementioned cationic surfactants.

If used, cationic surfactants will make up no more than 1.0% by weight of the cleansing composition. When present, cationic surfactants typically make up from 0.01 to 0.7%, and more typically, from 0.1 to 0.5% by weight of the cleansing composition, including any and all ranges and endpoints subsumed therein.

The structurant can be present in an amount of greater than or equal to 50% by weight of the overall cleansing composition. For example, the structurant can be present in an amount of 50% by weight, for example 55% by weight, for example, 60% by weight, for example, 65% by weight of the overall cleansing composition.

The fatty acid component of the structurant can comprise comprises palmitic acid, stearic acid, behenic acid, isostearic acid, arachidonic acid, hydroxystearic acid, or a combination thereof. In an aspect, the fatty acid component of the structurant can comprise stearic acid, palmitic acid, or a combination thereof.

The cleansing composition can further comprise a benefit agent.

The cleansing composition can additionally optionally include up to 30% by weight benefit agents based on the cleansing composition. Preferred benefit agents include moisturizers, emollients, sunscreens, and/or anti-ageing compounds. The agents may be added at an appropriate step during the process of making the bars. Some benefit agents may be introduced as macro domains.

Other optional ingredients like anti-oxidants, perfumes, polymers, chelating agents, colorants, deodorants, dyes, enzymes, foam boosters, germicides, anti-microbials, lathering agents, pearlescers, skin conditioners, stabilizers or superfatting agents, may be added in desirable amounts during processing of the cleansing composition. Preferably, the ingredients are added after the saponification step. Sodium metabisulphite, ethylene diamine tetra acetic acid (EDTA), or ethylene hydroxy diphosphonic acid (EHDP) are preferably added to the formulation. Fat soluble skin care actives like retinoids or resorcinols may also be included in the soap bar composition of the invention. Water soluble skin lightening agents like Vitamin B3 may also be included.

Useful skin benefit agents include the following:

(a) silicone oils and modifications thereof such as linear and cyclic polydimethylsiloxanes; amino, alkyl, alkylaryl, and aryl silicone oils;
(b) fats and oils including natural fats and oils such as jojoba, soybean, sunflower, rice bran, avocado, almond, olive, sesame, persic, castor, coconut, and mink oils; cacao fat; beef tallow and lard; hardened oils obtained by hydrogenating the aforementioned oils; and synthetic mono, di and triglycerides such as myristic acid glyceride and 2-ethylhexanoic acid glyceride;
(c) waxes such as carnauba, spermaceti, beeswax, lanolin, and derivatives thereof;
(d) hydrophobic and hydrophilic plant extracts;
(e) hydrocarbons such as liquid paraffin, petrolatum, microcrystalline wax, ceresin, squalene, pristan and mineral oil;
(f) higher fatty acids such as lauric, myristic, palmitic, stearic, behenic, oleic, linoleic, linolenic, lanolic, isostearic, arachidonic and poly unsaturated fatty acids (PUFA);
(g) higher alcohols such as lauryl, cetyl, stearyl, oleyl, behenyl, cholesterol and 2-hexydecanol alcohol;
(h) esters such as cetyl octanoate, myristyl lactate, cetyl lactate, isopropyl myristate, myristyl myristate, isopropyl palmitate, isopropyl adipate, butyl stearate, decyl oleate, cholesterol isostearate, glycerol monostearate, glycerol monolaurate, glycerol distearate, glycerol tristearate, alkyl lactate, alkyl citrate and alkyl tartrate;
(i) essential oils and extracts thereof such as mentha, jasmine, camphor, white cedar, bitter orange peel, ryu, turpentine, cinnamon, bergamot, citrus unshiu, calamus, pine, lavender, bay, clove, hiba, eucalyptus, lemon, starflower, thyme, peppermint, rose, sage, sesame, ginger, basil, juniper, lemon grass, rosemary, rosewood, avocado, grape, grapeseed, myrrh, cucumber, watercress, calendula, elder flower, geranium, linden blossom, amaranth, seaweed, ginko, ginseng, carrot, guarana, tea tree, jojoba, comfrey, oatmeal, cocoa, neroli, vanilla, green tea, penny royal, aloe vera, menthol, cineole, eugenol, citral, citronelle, borneol, linalool, geraniol, evening primrose, camphor, thymol, spirantol, penene, limonene and terpenoid oils;
(j) polyhydric alcohols, for example, glycerine, sorbitol, propylene glycol, and the like; and polyols such as the polyethylene glycols, examples of which are: Polyox WSR-205 PEG 14M, Polyox WSR-N-60K PEG 45M, or Polyox WSR-N-750, and PEG 7M;
(k) lipids such as cholesterol, ceramides, sucrose esters and pseudo-ceramides as described in European Patent Specification No. 556,957;
(l) vitamins, minerals, and skin nutrients such as milk, vitamins A, E, and K; vitamin alkyl esters, including vitamin C alkyl esters; magnesium, calcium, copper, zinc and other metallic components;
(m) sunscreens such as octyl methoxyl cinnamate (Parsol MCX) and butyl methoxy benzoylmethane (Parsol 1789);
(n) phospholipids; and
(o) anti-aging compounds such as alpha-hydroxy acids and beta-hydroxy acids.

Skin benefit agents commonly account for up to 30 wt. % of the liquid soap formulation, with levels of from 0 to 25 wt. %, more particularly from 0 to 20 wt %, being typical of the levels at which those skin benefit agents generally known as "emollients" are employed in many of the subject formulations. Preferred skin benefit agents include fatty acids, hydrocarbons, polyhydric alcohols, polyols, and mixtures thereof, with emollients that include at least one $C_{12}$ to $C_{18}$ fatty acid, petrolatum, glycerol, sorbitol and/or propylene glycol being of particular interest in one or more embodiments.

In an aspect, the benefit agent can comprise starch, fatty acids, hydrocarbons, polyhydric alcohols (polyols), polyols, petrolatum, glycerol, sorbitol and/or propylene glycol, sodium carboxymethylcellulose, inorganic particular matter (e.g., talc, calcium carbonate, zeolite, and combinations thereof of such particulates) or a combination thereof. Such benefit agents can be present in an amount of 0.05 to 35 by weight, based on the cleansing composition.

For example, the polyhydric alcohol can be a mixture of polyols. Polyol is a term used herein to designate a compound having multiple hydroxyl groups (at least two, preferably at least three) which is highly water soluble. Many types of polyols are available including: relatively low molecular weight short chain polyhydroxy compounds such as glycerol and propylene glycol; sugars such as sorbitol, manitol, sucrose and glucose; modified carbohydrates such as hydrolyzed starch, dextrin and maltodextrin, and polymeric synthetic polyols such as polyalkylene glycols, for example polyoxyethylene glycol (PEG) and polyoxypropylene glycol (PPG). Especially preferred polyols are glycerol, sorbitol, and combinations thereof. A most preferred polyol is glycerol. When present, polyols can be present in an amount of 0 to 10%, preferably 1 to 10%, more preferably 1 to 7.5% by wt. polyol. (e.g., glycerine). Such inclusion can reduce the cost of the cleansing composition and can also bring additional benefits for consumers, such as mildness.

Electrolytes can be included in the cleansing compositions. Electrolytes include compounds that substantially dissociate into ions in water. Electrolytes as disclosed herein are not ionic surfactants. Desirable electrolytes for inclusion in the soap making process are alkali metal salts. Preferred alkali metal salts for inclusion in the cleansing composition include sodium sulfate, sodium chloride, sodium acetate, sodium citrate, potassium chloride, potassium sulfate, sodium carbonate and other mono or di or tri salts of alkaline earth metals, more preferred electrolytes are sodium chloride, sodium sulfate, sodium citrate, potassium chloride and an especially preferred electrolyte is sodium chloride, sodium citrate or sodium sulphate or a combination thereof. In total, the electrolyte can be included in an amount of 0.1 to 8%, more preferably 0.5 to 6%, even more preferably 0.5 to 5%, furthermore preferably 0.5 to 3%, and most preferably 1 to 3% by weight of the composition.

Water can be included in the cleansing compositions. Water can be present in an amount of 8 to 22% by weight of the cleansing composition.

The cleansing composition can additionally optionally contain cationic polymers. The cationic polymer provides long-term germ-killing efficacy of the antimicrobial composition. The cationic polymer can generally be any cationic polymer but is preferably selected from polyquaternium-6 (poly diallyl dimethyl ammonium chloride (PDADMAC)), poly N-[3-(dimethylamino)propyl]methacrylamide (PDMAPMA), poly [2 (Dimethylamino)ethyl methacrylate]

(PDMAEMA), polyethylene imine (PEI), chitosan, or a combination thereof. Preferably, the cationic polymer is polyquaternium-6.

Other cationic polymers are quaternary nitrogen containing hydroxyethyl celluloses. Suitable examples of cationic polymers are salts of hydroxyethyl cellulose reacted with a trimethyl ammonium substituted epoxide, referred to in the industry by the Cosmetic, Toiletry, and Fragrance Association (CTFA) as polyquaternium-10 (PQ-10), the same being commercially available from Amerchol Corporation, a subsidiary of The Dow Chemical Company, as UCARE™ Polymer JR-125, UCARE Polymer JR-400, UCARE Polymer KF, UCARE Polymer JR-30M, UCARE Polymer LR-400, UCARE Polymer LR-30M, and UCARE Polymer LK. Other commercially available PQ-10 materials are KG30 or Sensomer 10M from Lubrizol.

Examples of other cationic polymers are referred to by CTFA as polyquaternium-67. They are commercially available from Amerchol Corp. as the SoftCAT™ polymers like SoftCAT SL 5, SoftCAT SL 30, SoftCAT SL 60, SoftCAT SL 100, SoftCAT SK-L, SoftCAT SK-M, SoftCAT SK-MH, SoftCAT SK-H, SoftCAT SX-400X, SoftCAT SX-400H, SoftCAT SX-1300X and SoftCAT SX-1300H. Other examples of cationic polymers are those referred to in the industry by the CTFA as polyquaternium-7 with the CAS Registry Number 026590 May 6, and those referred by the CTFA as polyquaternium-44. Still other cationic polymers include Jaguar $C_{13}S$, Jaguar $C_{14}S$, and Jaguar $C_{17}$ made commercially available from Solvay. Even other types of cationic cellulose ethers include the polymeric quaternary ammonium salts of hydroxyethyl cellulose reacted with lauryl dimethyl ammonium-substituted epoxide referred to in the industry (CTFA) as polyquaternium-24. Polyquaternium-32, polyquaternium-37 polyquaternium-16, polyquaternium-45, polyquaternium-28, polyquaternium-53 can also be used. Any combination of the above mentioned cationic polymers can be used in the cleansing compositions.

As to the percent substitution of nitrogen by weight (i.e., cationic substitution) within the cationic polymer, typically the percent nitrogen is 0.1 to 4%, and preferably, 0.3 to 3.5%, and most preferably, 1 to 2.8% by weight, based on total weight of the cationic polymer.

When present, the cationic polymer can be present in an amount of 0.01 to 5.0% by weight of the overall antimicrobial composition including all values and ranges subsumed therein, preferably, 0.1 to 4.0% by weight, more preferably, 0.5 to 2.0% by weight.

The cleansing composition can be used to deliver antimicrobial benefits. Antimicrobial agents that are preferably included to deliver this benefit include oligodynamic metals or compounds thereof. Preferred metals are silver, copper, zinc, gold or aluminium. Silver in the ionic form it may exist as a salt or any compound in any applicable oxidation state. Preferred silver compounds are silver oxide, silver nitrate, silver acetate, silver sulfate, silver benzoate, silver salicylate, silver carbonate, silver citrate or silver phosphate, with silver oxide, silver sulfate and silver citrate being of particular interest in one or more embodiments. Oligodynamic metal or a compound thereof can be included in 0.0001 to 2%, preferably 0.001 to 1% by weight of the cleansing composition.

Alternately an essential oil antimicrobial active may be included in the cleansing composition. Desirable essential oil actives which may be included are terpineol, thymol, carvacol, (E)-2(prop-1-enyl) phenol, 2-propylphenol, 4-pentylphenol, 4-sec-butylphenol, 2-benzyl phenol, eugenol or combinations thereof. Furthermore, preferred essential oil actives are terpineol, thymol, carvacrol or thymol, most preferred being terpineol or thymol and ideally a combination of the two. Essential oil actives can be included in 0.001 to 1%, preferably 0.01 to 0.5% by weight of the composition. Alternately other popularly used antimicrobial actives like chloroxylenol, trichlorocarban, and/or benzalkonium chloride may be included.

The cleansing composition can be in the form of a shaped solid, for example, a bar. The cleaning composition is a wash off product that generally has a sufficient amount of surfactants included therein such that it can be used for cleansing a desired surface such as a topical surface, e.g., the whole body, the hair, scalp, and/or the face. The cleansing composition can be applied on the topical surface and left thereon only for a few seconds or minutes and washed off thereafter with copious amounts of water. Alternately, it may be used for laundering clothes. In such an instance, the bar can be usually rubbed onto wet clothes, optionally brushed, and then rinsed with water to remove the residual soap and dirt.

Bars made from the cleansing composition can have a hardness value of greater than or equal to 1.0 kilograms (kg) (measured at 40° C.), for example, the bars can have a harness value of greater than or equal to 1.2, for example, the bars can have a hardness value of greater than or equal to 2. Such hardness values indicate that the bars can be processed via a high throughput extrusion process.

Through several processes all the ingredients, less the perfume, are combined in a mixer suitable for mixing viscous materials. The process is run at a temperature which insures homogeneity of the batch, generally between 180° to 240° F. (80° to 120° C.). When the target moisture has been achieved, the product is removed from the mixer and cooled forming either chips or noodles. The cooled material is then optionally combined with perfume and tumbled to ensure an even distribution of perfume throughout the product. The optionally perfumed material is then transported to a hopper which feeds a refiner, which in turn feeds a plodder. The billet which exits the plodder is then cut, stamped into a bar, and packaged. It can be difficult to stamp billets that are too soft (e.g., do not have a hardness of at least 1.0 kg (measured at 40° C.) into bars.

The cleansing composition can be made into bars by a process that first involves saponification of the fat charge with alkali followed by extruding the mixture in a conventional plodder. The plodded mass may then be optionally cut to a desired size and stamped with desirable indicia. Bars made from the cleansing compositions disclosed herein can be prepared in a high speed extruder where typically more than 200 bars/minute are extruded and stamped.

The following examples are merely illustrative of the cleansing compositions disclosed herein and are not intended to limit the scope hereof.

Except where otherwise explicitly indicated, all numbers in this description indicating amounts of material or conditions of reaction, physical properties of materials and/or use are to be understood as modified by the word "about." All amounts are by weight of the final composition, unless otherwise specified.

It should be noted that in specifying any range of concentration or amount, any particular upper concentration can be associated with any particular lower concentration or amount as well as any subranges consumed therein. In that regard, it is noted that all ranges disclosed herein are inclusive of the endpoints, and the endpoints are independently combinable with each other (e.g., ranges of "up to 25% by weight, or, more specifically, 5% by weight to 20% by weight, in inclusive of the endpoints and all intermediate values of the ranges of 5% by weight to 25% by weight, etc.). "Combination is inclusive of blends, mixtures, alloys, reaction products, and the like. Furthermore, the terms "first", "second", and the like herein do not denote any order, quantity, or importance, but rather are used to distinguish one element from another. The terms "a" and "an" and "the" herein do not denote a limitation of quantity and are to be construed to cover both the singular and the plural, unless otherwise indicated herein or clearly contradicted by context. The suffix "(s)" as used herein is intended to include both the singular and the plural of the term it modifies, thereby including one or more of the term (e.g., the film(s) includes one or more films). Reference throughout the specification to "one embodiment", "one aspect", "another embodiment", "another aspect", "an embodiment", "an aspect" and so forth means that a particular element (e.g., feature, structure, and/or characteristic) described in connection with the embodiment or aspect is included in at least one embodiment or aspect described herein and may or may not be present in other embodiments or aspects. In addition, it is to be understood that the described elements may be combined in any suitable manner in the various embodiments or aspects.

All cited patents, patent applications, and other references are incorporated herein by reference in their entirety. However, if a term in the present application contradicts or conflicts with a term in the incorporated reference, the term from the present application takes precedence over the conflicting term from the incorporated reference. While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

For the avoidance of doubt the word "comprising" is intended to mean "including" but not necessarily "consisting of" or "composed of." In other words, the listed steps, options, or alternatives need not be exhaustive.

The disclosure of the invention as found herein is to be considered to cover all aspects as found in the claims as being multiply dependent upon each other irrespective of the fact that claims may be found without multiple dependency or redundancy. Unless otherwise specified, numerical ranges expressed in the format "from x to y" are understood to include x and y. In specifying any range of values or amounts, any particular upper value or amount can be associated with any particular lower value or amount. All percentages and ratios contained herein are calculated by weight unless otherwise indicated. The various features of the present invention referred to in individual sections above apply, as appropriate, to other sections mutatis mutandis. Consequently, features specified in one section may be combined with features specified in other sections as appropriate. Any section headings are added for convenience only and are not intended to limit the disclosure in any way.

EXAMPLES

The constituents in all the tables are given in % by weight as present in that sample, unless it is a property that has been measured, in which case the units of the property are indicated therein.

Examples A-C; 1-4: Hardness, Lather, Zein Score, Stearate Remaining, pH

The following compositions were prepared using the components listed in Table 1. Samples 1 to 4 are inventive samples. Bars were made from the formulations by combining all the ingredients, less the perfume and other minor ingredients, in a mixer. The process was run at a temperature which ensured homogeneity of the batch, at a temperature of 180° to 240° F. (80° to 120° C.). When the target moisture was achieved, the product was removed from the mixer and cooled forming either chips or noodles. The cooled material was then combined with perfume and other minor ingredients and tumbled to ensure an even distribution of perfume throughout the product. The perfumed material was then passed through roll mills and transported to a refiner, which in turn fed a plodder. The billet which exited the plodder was then cut, stamped into a bar, and packaged.

The bars were tested for various properties including hardness, lather, Zein score, stearate remaining, and pH value according to the following protocols.

Hardness Testing Protocol

Principle

A 30° conical probe penetrates into a soap/syndet sample at a specified speed to a pre-determined depth. The resistance generated at the specific depth is recorded. There is no size or weight requirement of the tested sample except that the bar/billet be bigger than the penetration of the cone (15 mm) and have enough area. The recorded resistance number is also related to the yield stress and the stress can be calculated as noted below. The hardness (and/or calculated yield stress) can be measured by a variety of different penetrometer methods. In this invention, as noted above, we use probe which penetrates to depth of 15 mm.

Apparatus and Equipment

TA-XT Express (Stable Micro Systems)

30° conical probe—Part #P/30c (Stable Micro Systems)

Sampling Technique

This test can be applied to billets from a plodder, finished bars, or small pieces of soap/syndet (noodles, pellets, or bits). In the case of billets, pieces of a suitable size (9 cm) for the TA-XT can be cut out from a larger sample. In the case of pellets or bits which are too small to be mounted in the TA-XT, the compression fixture is used to form several noodles into a single pastille large enough to be tested.

Procedure

Setting Up the TA-XT Express

These settings need to be inserted in the system only once. They are saved and loaded whenever the instrument is turned on again. This ensures settings are constant and that all experimental results are readily reproducible.

Set Test Method

Press MENU
Select TEST SETTINGS (Press 1)
Select TEST TPE (Press 1)
Choose option 1 (CYCLE TEST) and press OK
Press MENU
Select TEST SETTINGS (Press 1)
Select PARAMETERS (Press 2)
Select PRE TEST SPEED (Press 1)
Type 2 (mm $s^{-1}$) and press OK
Select TRIGGER FORCE (Press 2)
Type 5 (g) and Press OK
Select TEST SPEED (Press 3)
Type 1 (mm $s^{-1}$) and press OK
Select RETURN SPEED (Press 4)
Type 10 (mm $s^{-1}$) and press OK Select DISTANCE (Press 5)
Type 15 (mm) for soap billets or 3 (mm) for soap pastilles and press OK
Select TIME (Press 6)
Type 1 (CYCLE)

Calibration

Screw the probe onto the probe carrier.
Press MENU
Select OPTIONS (Press 3)
Select CALIBRATE FORCE (Press 1)—the instrument asks for the user to check whether the calibration platform is clear
Press OK to continue and wait until the instrument is ready.
Place the 2 kg calibration weight onto the calibration platform and press OK
Wait until the message "calibration completed" is displayed and remove the weight from the platform.

Sample Measurements

Place the billet onto the test platform.
Place the probe close to the surface of the billet (without touching it) by pressing the UP or DOWN arrows.
Press RUN
Take the readings (g or kg) at the target distance (Fin).

After the run is performed, the probe returns to its original position.

Remove the sample from the platform and record its temperature.

Calculation & Expression of Results

Output

The output from this test is the readout of the TA-XT as "force" ($R_T$) in g or kg at the target penetration distance, combined with the sample temperature measurement. (In the subject invention, the force is measured in Kg at 40° C. at 15 mm distance)

Temperature Correction

The hardness (yield stress) of skin cleansing bar formulations is temperature-sensitive. For meaningful comparisons, the reading at the target distance ($R_T$) should be corrected to a standard reference temperature (normally 40° C.), according to the following equation:

$$R_{40} = R_T \times \exp[\alpha(T-40)]$$

where $R_{40}$=reading at the reference temperature (40° C.)
$R_T$=reading at the temperature T
α=coefficient for temperature correction
T=temperature at which the sample was analyzed.

Raw and Processed Data

The final result is the temperature-corrected force or stress, but it is advisable to record the instrument reading and the sample temperature also.

A hardness value of at least 1.0 kg (measured at 40° C.) is acceptable.

Lather Volume

Lather volume was related to the amount of air that a given soap bar composition is capable of trapping when submitted to standard conditions. Lather was generated by trained technicians using a standardized method given below. The lather was collected and its volume measured.

Apparatus and Equipment:

Washing up bowl—1 per operator capacity 10 liters
Soap drainer dishes—1 per sample
Surgeons' rubber gloves—British Standard BS 4005 or equivalent (see Note 14ii).
Range of sizes to fit all technicians
Tall cylindrical glass beaker—400 mL, 25 mL graduated (Pyrex n° 1000)
Thermometer—Mercury types are not approved
Glass rod—Sufficiently long to allow stirring in the glass beaker Procedure:

Tablet Pre-Treatment:

Wearing the specified type of glove well washed in plain soap, wash down all test tablets at least 10 minutes before starting the test sequence. This is best done by twisting them about 20 times through 180° under running water. Place about 5 liters of water at 30° C. of known hardness (hardness should be constant through a series of tests) in a bowl. Hardness can be measured, for example, in units of French degrees (° fH or ° f), which may also be defined as 10 mg/Liter of $CaCO_3$, equivalent to 10 parts per million (ppm). Hardness may typically range from 5 to 60° fH. Tests of the subject invention were conducted at 18° fH. Change the water after each bar of soap has been tested.

Take up the tablet, dip it in the water and remove it. Twist the tablet 15 times, between the hands, through 180°. Place the tablet on the soap dish (see Note).

The lather is generated by the soap remaining on the gloves.

Stage 1: Rub one hand over the other hand (two hands on same direction) 10 times in the same way (see Note).

Stage 2: Grip the right hand with the left, or vice versa, and force the lather to the tips of the fingers.

This operation is repeated five times.

Repeat Stages 1 and 2

Place the lather in the beaker.
Repeat the whole procedure of lather generation from paragraph iii, twice more, combining all the lather in the beaker.
Stir the combined lather gently to release large pockets of air. Read and record the volume.

Calculation & Expression of Results:

The data obtained consists of six results for each bar under test.

Data analysis is carried out by two way analysis of variance, followed by Turkey's Test.

Operators:

Experienced technicians should be able to repeat lather volumes to better than ±10%. It is recommended that technicians be trained until they are capable of achieving reproducible results from a range of different formulation types.

Notes:

Water hardness, as noted above, should be constant for a series of tests and should be recorded. Where possible, it is preferable to adhere to suitable water hardness. For example, bars which will be used in soft water markets should ideally be tested with soft water (e.g., lower end of French hardness scale).

It is important to keep the number of rubs/twists constant.

TABLE 1

| | | Example #s | | | | | | |
|---|---|---|---|---|---|---|---|---|
| | Function | A | 1 | 2 | B | 3 | C | 4 |
| Component | | | | | | | | |
| C16/C18 soap | structurant | 25.16 | | | 25.16 | | 25.16 | |
| C16/C18 acid | structurant | 46.74 | 48 | 65.8 | 46.74 | 67.8 | 46.74 | 67.8 |
| SDS* | surfactant | 20 | 20 | 20 | 5 | 5 | | |
| SCI** | surfactant | | | | | | 10 | 10 |
| C16MES*** | surfactant | | | | 15 | 15 | 10 | 10 |
| CAPB**** | surfactant | 2 | 2 | 2 | 2 | 2 | 2 | 2 |
| Chiffon Petal | fragrance | 1 | 1 | 1 | 1 | 1 | 1 | 1 |
| Glycerin | | 0 | 4 | 6 | 0 | 4 | 0 | 4 |
| Polyox | Slip modifier | 0.1 | 0.2 | 0.2 | 0.1 | 0.2 | 0.1 | 0.2 |
| Water | | 5 | 5 | 5 | 5 | 5 | 5 | 5 |
| Properties | | | | | | | | |
| Hardness (kg @40° C.) | | 2.4 | 1.5 | 1.2 | 2.6 | 1.6 | 2.7 | 1.2 |
| Lather | | 389 | 290 | 308 | 385 | 307 | 388 | 301 |
| Zein Score | | 0.48 | 0.37 | 0.35 | | | 0.28 | 0.2 |
| Stearate Remaining (%) | | 22 | 39 | 39 | 12.5 | 24.8 | 22 | 37 |
| pH | | 7.1 | 6.1 | 6.23 | 7.2 | 5.5 | 7.2 | 5.5 |

*SDS = sodium dodecyl sulfate/sodium lauryl sulfate
**SCI = sodium cocoyl isethionate
***C16MES = C16 methyl ester sulfonate
***CAPB = cocamidopropyl betaine As can be seen from Table 1, each of Examples 1 to 4, the inventive samples, containing no soap, had a hardness level that was greater than or equal to 1.0 kg measure at 40° C., indicating that the inventive bars have the desired hardness and will be able to be made in high throughput processes. Such a result was surprising, as without the presence of soap acting as a structurant, it was not previously believed that bar made from a soapless or low % by weight amount of soap would have sufficient hardness to be processed and processed in a high throughput extrusion process.

Also demonstrated in Table 1, are the lather scores for the samples. A lather score of greater than or equal 250 is acceptable. As noted by Examples 1 to 4, the lather scores were all well-above 250, which indicates that even without soap, or with low levels of soap, bars made from the compositions still lather well.

The Zein test was used to test skin irritancy of a surfactant composition. Zein score was measured using a Zein test which determines the extent of denaturization of Zein corn protein after exposure to a surfactant for a given period of time. In general, a higher Zein score means a greater potential for skin irritation. The properties of the final product as regards 'harshness' were assessed using a test substantially similar to the 'Zein' test as described by E. Gotte in Proceedings of the IVth International Congress on Surface Active Substances (Brussels (1964), [3] pp 83-90) at a 2 percent wt. dilution level. As seen from the examples, Examples 1 to 4 each had Zein scores of less than 0.40 and a Zein score of 0.20 to 0.40, lower than that for Example A containing soap. It can also be seen that the Zein value of the products prepared with these compositions ranged from 0.20 to 0.40, indicating a positive benefit as regards reduced harshness whereas Example A had a higher Zein score value and thus was harsher to proteins than the inventive examples.

The lipid mildness test called "Stearate remaining" was measured in the following way. A solution of lipid mixture spiked with fluorescent dye 12-N-methyl-(7-nitrobenz-2-oxa-1,3-diazo)aminostearic acid (12-NBD stearate) is prepared in isopropanol. The composition of the solution: Palmitic acid—0.17 mg/ml; Stearic acid—0.19 mg/ml; Cholesterol—0.32 mg/mL; Ceramide 24:0—1.22 mg/mL; 12-NBD stearate (fluorescent dye)—29 μg/mL. 70 μL of the solution is applied to 25 mm discs of Whatman Grade 5 filter paper. After the solvent evaporated at room temperature, the discs are incubated for one hour at 70° C. To evaluate bar mildness, 1% bar solution in DI water is prepared.

One disc with lipids is added to a scintillation vial with 20 mL 1% bar solution. Vials are rolled on a hotdog roller (Benchmark USA 62010) for 15 minutes at room temperature. Then, test solutions are decanted from the vials, discs are rinsed with DI water and are placed in a fume hood to dry. After drying, residual fluorescent dye (12-NBD stearate) is extracted from discs with isopropanol and quantified via fluorescence spectrometry (excitation wavelength=466 nm; emission wavelength=530 nm). A higher value of 12-NBD stearate (stearate remaining) indicates that tested soap is milder to the skin; that is after washing there will be higher presence of skin lipids, meaning that the skin would be less dry.

As can be seen, Examples 1 to 4, the soap free inventive samples, all showed higher percentages of stearate remaining than Samples A, B, or C, each containing soap, which means that Examples 1 to 4 are milder to the skin lipids.

As noted in Table 1, pH of the inventive samples was 5.5 to 6.2, which is closer to skin pH than Samples A,B,C.

Thus, in in-vitro mildness tests—zein dissolution and stearate remaining, all inventive soap-free samples 1 to 4 are milder to both proteins and lipids than comparative samples A,B,C.

The invention claimed is:

1. A cleansing composition, comprising:

a surfactant, wherein the surfactant is present in an amount of less than or equal to 30% by weight, based on the overall cleansing composition, wherein the surfactant comprises an anionic surfactant and a zwitterionic surfactant, wherein the anionic surfactant comprises sodium cocoyl isethionate, sodium lauryl taurate, sodium alkyl (C16) methyl ester sulfonate, disodium lauryl sulfosuccinate, or sodium dodecyl sulfate and the zwitterionic surfactant comprises cocoamidopropyl betaine; wherein the cleansing composition does not comprise nonionic surfactant, and a structurant, wherein the structurant is present in an amount of greater than or equal to 50% by weight, based on the overall cleansing composition;

wherein the structurant comprises a mixture of a fatty acid and a fatty acid soap, wherein the fatty acid is present in an amount of greater than or equal to 95% by weight of the mixture and wherein the fatty acid soap is present in an amount of less than or equal to 5% by weight of the composition;

wherein the cleansing composition is in the form of a bar;

wherein the fatty acid is selected from stearic acid, palmitic acid, or a combination thereof;

wherein the cleansing composition has a pH of 4.5 to 6.0.

2. The cleansing composition of claim 1, further comprising a benefit agent, wherein the benefit agent comprises starch, fatty acids, hydrocarbons, polyhydric alcohols, petrolatum, glycerol, sorbitol and/or propylene glycol, or a combination thereof.

3. The bar of claim 1, wherein the bar has a hardness value of greater than or equal to 1.0 kg measured at 40° C.

4. The cleansing composition of claim 1, wherein the composition comprises less than or equal to 1% by weight of the fatty acid soap.

5. The cleansing composition of claim 1, wherein the fatty acid is present in an amount of greater than or equal to 99% by weight of the mixture.

* * * * *